3,478,002
COPOLYMERS OF SUBSTITUTED NORBORNENES AND OLEFINS AND PROCESS FOR PRODUCING THE SAME
Kohei Nakaguchi, Osaka, Shohachi Kawasumi, Niihama-shi, Masaaki Hirooka, Ibaraki-shi, and Toshimichi Fujita, Niihama-shi, Japan, assignors to Sumitomo Chemical Company, Ltd., Higashi-ku, Osaka, Japan
No Drawing. Filed May 11, 1966, Ser. No. 549,138
Claims priority, application Japan, May 13, 1965, 40/28,340; May 18, 1965, 40/29,186
Int. Cl. C08f *1/34, 15/02*
U.S. Cl. 260—79.5                          9 Claims

ABSTRACT OF THE DISCLOSURE

Sulfur-curable terpolymers of a 5 or 6 position substituted norbornene, ethylene, and an α-olefin of from 3–20 carbon atoms are prepared by reacting a mixture of the monomers in the presence of a catalyst system including an alkylaluminum compound and a vanadium compound. Preferred catalyst components include as the aluminum compound, diethylaluminum chloride, ethylaluminum sesquichloride or ethylaluminum dichloride, and, as the vanadium component, vanadium halide, vanadium oxyhalide, vanadium halo-ortho-vanadate, vanadium acetylacetonate or vanadium haloacetylacetonate.

---

This invention relates to copolymers of substituted norbornenes and olefins, and a process for producing the same. More particularly, the invention pertains to terpolymers of norbornenes having a halogen or hydrocarbon group in the 5- and/or 6-position, ethylene and α-olefins having at least three carbon atoms, and a method for the production of such copolymers.

Ethylene-propylene copolymers have excellent characteristics as rubbers but have no unsaturated linkages in the molecules, unlike general-used rubbers and hence have suffered from such a great drawback that they cannot be sulfur-cured. Attempts have therefore been made to make them sulfur-curable by effecting ternary copolymerization using various diene compounds as the third component monomers and introducing unsaturated linkages into the copolymers. As these diene components, all the diene compounds are not available. As preferable diene compounds, there have frequently been employed dicyclopentadiene, 5-methylene-2-norbornene, 5-methyl-2,5-norbornadiene, 1,5-cyclooctadiene and 1,4-hexadiene. In addition thereto, many compounds were tested for this kind of purpose, and were disclosed in several patent specifications. However, all these components are diene-type or polyene-type compounds having at least two unsaturated groups.

In contrast to the above, the present invention provides copolymers of substituted norbornenes having the formula,

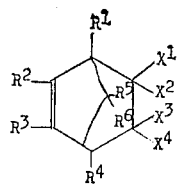

wherein $X^1$, $X^2$, $X^3$ and $X^4$ are each a halogen, hydrogen or a hydrocarbon group and at least one of them is a halogen or hydrocarbon group; and $R^1$, $R^2$, $R^3$, $R^4$, $R^5$ and $R^6$ are each hydrogen, a hydrocarbon group or halogen, ethylene and α-olefins having the formula, $$CH_2=CHR^7$$

wherein $R^7$ is a hydrocarbon group having 1 to 20 carbon atoms. The invention further provides a process for producing such terpolymers, which comprises contacting the aforesaid monomers with a catalyst system containing, as essential constituents, a vanadium compound and an organoaluminum compound having the formula,

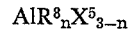

wherein $R^8$ is a hydrocarbon group having 1 to 20 carbon atoms; $X^5$ is halogen; and $n$ is an arbitrary number of 1 to 3.

It is a well known fact that in the homo-polymerization of norbornene or substituted norborness, a suitable selection of catalyst system and polymerization conditions results in polymers having double bonds in the molecules. Only from said fact, however, it cannot be said to be self-evident whether or not the above can be extended to copolymerization, particularly to ternary copolymerization. The present inventors attempted the ternary copolymerization of ethylene, propylene and norbornene using ethylaluminum sesquichloride and vanadyl trichloride as catalyst, but the iodine number of the resulting copolymer, which is a measure showing the amount of unsaturated group, indicated no substantial difference from the iodine number of an ethylene-propylene copolymer (which is considered to be ascribable to the terminal double bonds), and the copolymer could not be sulfur-cured. In contrast, in accordance with the process of the present invention, there is observed, in general, increase in iodine number without the addition of any diene component, or is observed the introduction of a group equivalent in effectiveness thereto. According to the process of the present invention, copolymers having an iodine number of 0.5–50 are obtained, in general. Most of the conventionally known sulfur-curable ethylene-olefin copolymers, particularly ethylene-propylene-diene system ternary copolymers, have an iodine number of 8 to 20, generally 10 to 15. In accordance with the process of the present invention, however, copolymers having the aforesaid iodine number can be obtained when the conditions have been selected suitably, or even copolymers having an iodine number of less than 2 can give excellent vulcanizates, and even those relatively low in iodine number can be sulfur-cured, in general.

In the process of the present invention, copolymers obtained by use of halogen-containing norbornenes are characterized by containing halogen and unsaturated groups. The content of halogen in the copolymer is variable to a wide range. Ordinarily, however, copolymers containing halogen in a content of 0.4–30 wt. percent, particularly 1–10 wt. percent, are desirable. In case ethylene-propylene copolymers have been chlorinated, no excellent curability can be expected unless the chlorinated copolymers have a chlorine content of at least 5 wt. percent. In the process of the present invention, however, even copolymers having a halogen content of less than 2% can give sulfur-cured, vulcanizates excellent in tensile strength, in most cases.

The copolymers obtained in accordance with the process of the present invention are normally solid and have an intrinsic viscosity of 0.5–10 dl./g., in general. The curing characteristics of these copolymers vary depending on the properties thereof but are curable according to various processes, which have been known hitherto, such as for example, peroxide-curing, oxime-curing, curing by use of divinyl compounds or styrene and sulfur-curing. Conventionally known sulfur-curable copolymers of ethylene and olefins, particularly propylene, can be formed into vulcanizates having excellent mechanical properties. For example, carbon-compounded rubber ordinarily show a tensile strength at break of 150–230 kg./cm.². Natural rubbers are highest in strength and their tensile strength values are 220-270 kg./cm.², and those particularly great in strength are considered to show the values of about 300-310 kg./cm.². It has however been found that in the process of the present invention, rubbers markedly high in tensile strength can be obtained by suitable selection of conditions, particularly when halogen-containing norbornenes are used. For example, excellent rubbers having a tensile strength at break of 360 kg./cm.² can be obtained. This can never be expected in the case of conventional ethylene-olefin copolymers. It is to be noted that the rubbers obtained according to the present invention are superior to natural rubber. A product according to the process of the present invention is shown in the following table in comparison with other rubbers:

MECHANICAL PROPERTIES OF VULCANIZATES

| | Rubber of present process | Conventional EP rubber | Natural rubber |
|---|---|---|---|
| Composition | | | |
| | Ethylene-propylene-halogen-containing norbornene | Ethylene-propylene-dicyclopentadiene | |
| Curing prescription | (1) | (1) | (2) |
| Tensile strength (kg./cm.²) | 358 | 223 | 244 |
| Elongation at break (percent) | 620 | 360 | 455 |
| 300% modulus (kg./cm.²) | 116 | 186 | 139 |

¹ 100 parts rubber, 5 parts ZnO, 50 parts HAF Black, 1.5 parts sulfur, 1.5 parts tetramethylthiuram disulfide, 0.5 part mercaptobenzothiazole; press-curing at 160° C. for 40 minutes.
² 100 parts rubber, 5 parts ZnO, 50 parts HAF Black, 3 parts sulfur, 1 part diphenylguanidine; press-curing at 140° C. for 40 minutes.

The olefins employed in the process of the present invention are α-olefins having the formula, $$CH_2=CH.R^7$$

wherein $R^7$ is a hydrocarbon group having 1 to 20 carbon atoms and as $R^7$ alkyl, aryl, aralkyl, alkylaryl and cycloalkyl groups are particularly preferred. Such compounds include, for example, propylene, butene-1; pentene-1; 3-methyl-butene-1; hexene-1; 3-methylpentene-1; 4-methyl-pentene-1; heptene-1; 4-methyl-hexene-1; 5-methyl-hexene-1; 4,4-dimethyl-pentene-1; octene-1; 4-ethyl-hexene-1; 4-methyl-heptene-1; 5-methyl-heptene-1; 4,4-dimethyl-hexene-1; 6-methyl-heptene-1; 5,6,6-trimethyl-heptene-1; decene-1; 2-ethyl-hexene-1; octadecene-1; styrene; p-methyl-styrene; 2-vinyl-naphthalene; vinyl-cyclopentane and vinyl cyclohexane. Of these, lower alkenes such as propylene and butene-1 are frequently used.

The substituted norbornenes employed in the process of the present invention are compounds having the formula

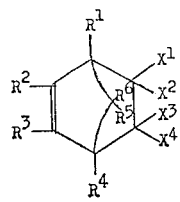

wherein $X^1$, $X^2$, $X^3$, $X^4$, $R^1$, $R^2$, $R^3$, $R^4$, $R^5$ and $R^6$ have the same meanings as identified above. Of these groups, the halogen includes chlorine, bromine and iodine, and fluorine may be used in some cases. Particularly, chlorine and bromine are liable to give desirable results. The hydrocarbon groups preferably are those having from 1 to 20 carbon atoms and include, for example, alkyl, aryl, aralkyl, alkylaryl and cycloalkyl groups. As $R^1$, $R^2$, $R^3$, $R^4$, $R^5$ and $R^6$ hydrogen or lower alkyl groups are frequently used. At least one of $X^1$, $X^2$, $X^3$ and $X^4$ are halogen or hydrocarbon group. Substituted norbornenes, in which halogen is directly linked to the nucleus, include, for example, 5-chloro-norbornene-2;
5-bromo-norbornene-2;
5-iodo-norbornene-2;
5,5-dichloro-norbornene-2;
5,6-dichloro-norbornene-2;
5,5,6-trichloro-norbornene-2;
5,5,6,6-tetrachloro-norbornene-2;
5-chloro-6-methyl-norbornene-2;
5-bromo-6-ethyl-norbornene-2;
5-chloro-5-methyl-norbornene-2;
5-chloro-6,6-dimethyl-norbornene-2;
5,7-dichloro-norbornene-2;
5,6,7-trichloro-norbornene-2;
5-chloro-7-methyl-norbornene-2;
5-chloro-7,7-dimethyl-norbornene-2;
5,5-dichloro-7,7-dimethyl-norbornene-2;
1-methyl-5-chloro-norbornene-2;
5-methyl-5-chloro-7,7-dimethyl-norbornene-2;
1-methyl-6-chloro-norbornene-2;
1-chloro-5-chloro-norbornene-2;
1,7-dimethyl-5-chloro-norbornene-2;
1,7,7-trimethyl-6-chloro-norbornene-2;
1,4,7-trimethyl-5-chloro-norbornene-2;
2,3-dimethyl-5-chloro-norbornene-2;
1,2,3,4-tetramethyl-5-chloro-norbornene-2;
1,2,5,5-tetramethyl-6-chloro-norbornene-2;
2,5-dichloro-norbornene-2;
2,6-dichloro-norbornene-2;
2-phenyl-5-chloro-norbornene-2; and
1,7,7-trimethyl-2-cyclohexyl-5-chloro-norbornene-2.

5-chloro-norbornene-2 and 5-bromo-norbornene-2 are frequently used, in particular.

The norbornenes having at least one hydrocarbon group in the 5- or 6-position include, for example, 5-methyl-norbornene-2;
5-ethyl-norbornene-2;
5-isobutyl-norbornene-2;
5-hexyl-norbornene-2;
5-octadecyl-norbornene-2;
5-isopropyl-norbornene-2;
5-benzyl-norbornene-2;
5-phenyl-norbornene-2;
5-p-toluyl-norbornene-2;
5-α-naphthyl-norbornene-2;
5-cyclohexyl-norbornene-2;
5,6-dimethyl-norbornene-2;
5,5-dimethyl-norbornene-2;
5,5,6-trimethyl-norbornene-2;
5,5,6,6-tetramethyl-norbornene-2;
5,7-dimethyl-norbornene-2;
5-ethyl-7-methyl-norbornene-2;
5,7,7-trimethyl-norbornene-2;
4,5-dimethyl-norbornene-2;
4,5,5-trimethyl-norbornene-2;
4,6,6-trimethyl-norbornene-2;
4,5,7,7-tetramethyl-norbornene-2;
2,5,5-trimethyl-norbornene-2;
2,3,4,5-tetramethyl-norbornene-2; and
2-phenyl-5,7,7-trimethyl-norbornene-2.

Of these, norbornenes having a lower alkyl group in the 5-position are particularly preferred.

The organoaluminum compounds having the formula $$AlR^8{}_nX^5{}_{3-n}$$

wherein $R^8$ and $X^5$ have the same meanings as identified above. As $R^8$, an alkyl, alkenyl, aryl, aralkyl, alkylaryl or cycloalkyl group is preferred. Thus, the compounds are those having, for example, a methyl, ethyl, propyl, butyl, hexyl, octyl, decyl, dodecyl, stearyl, phenyl, toluyl, naphthyl, benzyl, cyclopentadienyl or cyclohexyl or a derivative group thereof. Concretely, these compounds include methylaluminum dichloride,
ethylaluminum dichloride,
isobutylaluminum dichloride,
ethylaluminum dibromide,
arylaluminum dichloride,
vinylaluminum dichloride,
ethylaluminum sesquichloride,
methylaluminum sesquibromide,
ethylaluminum sesquiiodide,
isobutylaluminum sesquichloride,
hexylaluminum sesquichloride,
phenylaluminum sesquichloride,
cyclohexylaluminum sesquichloride,
diethylaluminum chloride,
diethylaluminum bromide,
dipropylaluminum chloride,
didodecylaluminum chloride,
diethylaluminum fluoride,
ethylphenylaluminum chloride,
trimethylaluminum,
triethylaluminum,
tripropylaluminum,
triisobutylaluminum,
trihexylaluminum,
tridecylaluminum,
triphenylaluminum,
tricyclohexylaluminum and
tribenzylaluminum.

Further, mixtures of said compounds or mixtures thereof with aluminum halides may also be used so far as average composition of the mixture corresponds to the above-mentioned formula.

As the vanadium compound, i.e. the other component of the catalyst employed in the present invention, one having at least one group selected from halogen, alkoxy, acetylacetonate and cyclopentadienyl groups is particularly preferred. Such compound includes, for example, vanadium tetrachloride,
vanadium tridichloride,
vanadyl trichloride,
vanadyl tribromide,
vanadyl dibromide,
vanadium triacetylacetonate,
chlorovanadyl diacetylacetonate,
dichlorovanadyl monoacetylacetonate,
dichlorovanadyl diacetylacetonate,
vanadyl diacetylacetonate,
dicyclopentadienyl vanadium dichloride,
triethyl orthovanadate,
di-n-butyl-monochloro-orthovanadate,
ethyl-dichloro-orthovanadate,
n-butyl-dichloro-orthovanadate,
n-hexyl-dichloro-orthovanadate and
cyclohexyl-dichloro-orthovanadate.

If necessary, other vanadium compounds capable of forming coordination catalysts with the aforesaid organoaluminum compounds may be used. For example, organic acid salts of vanadium, vanadium phosphate, salicylate and other vanadium compounds are employed.

The present invention is a method in which the polymerization is effected using catalyst systems containing, as essential constituents, such organoaluminum compounds and vanadium compounds as mentioned above. If necessary, however, other suitable compounds may be added as third catalyst components. Such compounds are, for example, electron donor compounds which form coordination compounds with the organoaluminum compounds or vanadium compounds or which have other alternating actions. These compounds include compounds of Vb group elements of the Mendeleev's Periodic Table and various chelating agents such as, for example, amines, cyclic nitrogen compounds, acid amines, ethers, esters, ketones, aldehydes and phosphorus, arsenic, antimony and bismuth compounds. In addition, there may be used various oxidizing compounds which are considered to be effective for preventing the vanadium compounds from excessive reduction with organoaluminum compounds. Such compounds are, for example, halogens, sulfur, metal halides, oxygen, nitro compounds, nitroso compounds, organic nitrates, nitrites, N-oxide compounds, P-oxide compounds, azo compounds, organic sulfides, disulfides, quinones and acid halides. Further, it is also possible to use suitable reagents having molecular weight-controlling action, such as hydrogen and the like.

The composition of copolymer in the present invention is not limited, but may be widely varied according to the desired properties of the products. As to ethylene contents in the copolymer, the proportion of 5 to 99 mol percent are generally used. For the purpose of obtaining an amorphous copolymer having good curing properties, preferable ethylene contents are in a range of 25 to 95 mol percent, especially 50 to 95 mol percent. The $\alpha$-olefin contents in the copolymer preferably range from 5 to 95 mol percent. The contents of substituted norbornenes in the copolymer are frequently used in a range of 0.1 to 50 mol percent, preferably 0.5 to 20 mol percent. Other proportions, however, can be also used.

The proportion of the organoaluminum compounds and vanadium compounds employed in the process of the present invention is not particularly limited. However, desirable results are liable to be obtained when they are used at a proportion of from 1:1 to 10,000:1, preferably from 2:1 to 300:1. When the above proportion is expressed by concentration in the reaction system, the vanadium compounds are frequently used at a concentration of 0.01–50 mmol/l., particularly 0.05-5 mmol/l. In some cases, however, they show excellent activity even at such a low concentration of below 0.01 mmol/l., e.g. at a concentration of about $10^{-4}$ mmol/l. As to the organoaluminum compounds, a concentration in the reaction system of 0.1–100 mmol/l., particularly 1–20 mmol/l., is frequently employed.

Further, the substituted norbornenes are frequently used at a concentration in the reaction system of 0.1–1,000 mmol/l., preferably 1–100 mmol/l.

Conventionally, in effecting ternary copolymerization reactions by adding various diene compounds to ethylene and propylene, the added diene components greatly retard the polymerization reactions of olefines, in general. However, the substituted norbornenes employed in the process of the present invention show no such great retarding effect as exhibited by the diene compounds but advantageously give polymers in high yields.

Regarding the kind of the organoaluminum compounds, the halogen-containing organoaluminum compounds readily give particularly desirable results rather than the trialkylaluminum compounds. The trialkylaluminum compounds, in general, are low in activity and tend to by-produce unhomogeneous copolymers insoluble in solvents such as heptane and the like. Of the halogen-containing organo-aluminum compounds, dialkylaluminum halides, alkylaluminum sesquihalides and alkylaluminum dihalides are particularly preferred. When alkylaluminum dihalides are used, there is such an example that when a benzenesulfonyl chloride, for example, is added as a third component of catalyst, excellent activity can be attained even though the concentration of vanadium compound employed is 1/100 or less than the concentration in ordinary other catalyst system. Favorable results are liable to be obtained when the organic group of the organoaluminum compound is an alkyl group, particularly ethyl group.

The catalyst components and monomers are not particularly restricted in the order of addition but may be added to the reaction system according to optional procedures. Generally speaking, however, the separate addition of respective catalyst components to the polymerization system in the presence of monomers results in higher catalyst activity than in the case where a mixture of catalyst components is used. In view of the change in catalyst activity due to lapse of time, however, there are some cases where the use of catalyst components which have previously been mixed and reacted is preferable. The monomer components, particularly norbornene derivatives, may either be previously dissolved in a reaction medium or be added simultaneously with other monomers, either continuously or intermittently. The proportion of ethylene and α-olefin varies depending on the desired properties of the resulting copolymer. In case ethylene is used in excess, crystalline copolymers tend to be formed. For the production of amorphous elastomers, which are chiefly desired in the present invention, it is necessary to avoid such conditions where ethylene is used in excess. For this, it is desirable to adopt a condition where ethylene is charged in a proportion of at most 85 mol percent, for example. Generally speaking, however, it is liable to obtain copolymers having more random structure than in the case where the conventional diene components are used as the third component monomers.

The polymerization reaction may be effected under reduced pressure, in the state diluted with other inert gas or under the pressure up to 100 kg./cm.$^2$. The polymerization may be effected at any temperature within the range of from such a low temperature as −78° C. to such a heated state as +100° C. Generally, a temperature between −35° C. and 70° C. gives favorable results. In the process of the present invention, the low temperature conditions are of importance. This is ascribable to the fact that the lower the temperature, the greater the durability of catalyst activity and the longer the catalyst life, and therefore high polymer yields can be obtained, in most cases, rather than under high temperature conditions, and that copolymers obtained at low temperatures are excellent in properties, in general. Such characteristics are effectively displayed when the polymerization is effected at temperatures of below 0° C., particularly below −10° C. However, excellent copolymers can, of course, be obtained at elevated temperatures of above 0° C.

In practicing the process of the present invention, the polymerization may be carried out in the absence of solvent in, for example, liquefied monomers, but an inert medium can be used. As the inert medium of this kind, an ordinary hydrocarbon compound or a halogenated hydrocarbon compound is suitable. Such compound includes, for example, propane, butane, pentane, hexane, heptane, octane, petroleum ether, ligroin, other petroleum series mixed-solvents, benzene, toluene, xylene, cyclohexane, methyl-cyclohexane, methylene dichloride, ethylenedichloride, trichloroethane, tetrachloroethylene, butylchloride, chlorobenzene and bromobenzene.

After completion of the polymerization reaction, after-treatments are effected according to ordinary procedures and the resulting polymer can be purified and recovered. As these procedures, there are adopted alcohol treatment, alcohol-hydrochloric acid treatment, hydrochloric acid-water treatment, alkali treatment, aqueous emulsifier solution treatment and after-treatment utilizing chelating agents, or other optional after-treatment procedures employed in polymerization using Ziegler-Natta catalysts. Alternatively, the polymer may be salted-out without being subjected to said treatments, or the solvent may be removed as such to recover a solid substance. Further, a stabilizer and other additives can be added either during or after said treatments.

The present invention is illustrated further in detail with reference to the following examples, but the invention is not limited to the examples.

EXAMPLE 1

A 2 l. four-necked flask was evacuated and replaced with nitrogen. Into the flask, 1 l. of n-heptane was charged and an equimolar mixed gas of ethylene and propylene was introduced for 40 minutes at a rate of 3 N l./min. to saturate the n-heptane at a temperature of 25° C. To this was added 25 mmol of a 5-chloro-norbornene-2 mixture consisting of 59.7% of endo-type 5-chloro-norbornene-2 and the remainder composed mainly exo-type 5-chloro-norbornene-2. Further, 4 mmol of ethylaluminum sesquichloride (AlEt$_{1.5}$Cl$_{1.5}$) and 0.25 mmol of vanadyl trichloride were added in this order, and polymerization was effected at 25° C. for 15 minutes while introducing a mixed gas of ethylene and propylene in the above-mentioned proportion. After 15 minutes, about 15 ml. of methanol was added to the system to cease the polymerization. The reaction mixture, which was a homogeneous solution, was washed several times with a hydrochloric acid-methanol mixed liquid, was washed with water and was then charged into a large amount of methanol to deposit a polymer. The solid material was dried in vacuum at 50° C. to obtain 10.07 g. of light yellow rubbery solid polymer. The viscosity of polymer was measured in xylene solution at 120° C. to find that its intrinsic viscosity was 1.77 dl./g. With reference to the infrared absorption spectrum of the polymer, the propylene content thereof was measured according to Wei's method, in the manner similar to the case of an ethylene-propylene copolymer, to obtain a value of 25.7 mol percent. Further, the iodine number of the polymer measured in carbon tetrachloride solution was 8.3 and was obviously greater than the iodine number 0.65 of a copolymer obtained under the same conditions without the addition of chloronorbornene. The chlorine content of the polymer was 1.65 wt. percent.

On the other hand, 100 parts of the polymer was compounded with 5 parts of ZnO, 50 parts of HAF black, 1.5 parts of sulfur, 1.5 parts of tetramethylthiuram disulfide and 0.5 part of mercaptobenzothiazole, and was subjected to sulfur-curing under the conditions of press-curing at 160° C. for 40 minutes, whereby the vulcanizate showed such values as a tensile strength at break of 212 kg./cm.$^2$, an elongation of 670% and a 300% modulus of 59 kg./cm.$^2$.

A copolymer obtained under the same polymerization conditions without the addition of chloro-norbornene was subjected to sulfur-curing according to the same compounding prescription as above, to obtain a vulcanizate showing a tensile strength of 0 kg./cm.$^2$ and an elongation of 120%.

EXAMPLE 2

A 5 l. 4-necked flask was evacuated, replaced with nitrogen, charged with 3.5 l. of n-heptane and cooled to −20° C. Into the flask, an ethylene-propylene mixed gas containing 40 mol percent of ethylene was introduced to saturate into the n-heptane. To the flask, 210 mmol of 5-chloro-norbornene having the same composition as that used in Example 1, 35 mmol of diethylaluminum chloride and 0.875 mmol of vanadyl trichloride were added in this order, to effect polymerization. During the polymerization, the temperature was increased due to head of reaction but was maintained so as to become below −10° C. By the polymerization for 30 minutes, 82.11 g. of a white solid polymer was obtained. The polymer had an intrinsic viscosity of 4.76, a propylene content of 32.2 mol percent and an iodine number of 4.5. The polymer was subjected to press-curing at 160° C. for 5 minutes according to the same prescription as in Example 1 to obtain a vulcanizate showing such values as a tensile strength of 348 kg./cm.$^2$, an elongation of 600% and a 300% modulus of 96 kg./cm.$^2$. This shows the fact that the curing velocity is markedly high.

EXAMPLE 3

Using the same flask as in Example 1, 1 l. of n-heptane was saturated at −20° C. with an ethylene-propylene mixed gas. To the flask, 10 mmol of diethylaluminum chloride, 0.25 mmol of vanadyl trichloride and 50 mmol of 5-chloro-norbornene-2 were added, with stirring, in this order. Polymerization was effected for 5 minutes and the same after-treatment as in Example 1 was conducted to obtain 10.82 g. of a white solid copolymer. The copolymer had an intrinsic viscosity of 5.25, an iodine number of 3.2 and a chlorine content of 1.16 wt. percent. The copolymer was sulfur-cured in the same manner as in Example 1 to obtain a vulcanizate having a tensile strength of 273 kg./cm.$^2$, an elongation of 430% and a 300% modulus of 131 kg./cm.$^2$.

EXAMPLE 4

The same polymerization as in Example 1 was effected for 15 minutes, using an ethylene-propylene mixed gas containing 30 mol percent of ethylene and employing 5 mmol of 5-chloronorbornene-2, to obtain 22.95 g. of a copolymer having an intrinsic viscosity of 2.73, an iodine number of 4.6 and a chlorine content of 1.35 wt. percent.

This copolymer was subjected to oxime-curing according to the following carbon-compounding prescription:

| | |
|---|---|
| Copolymer | 100 |
| Dicumyl peroxide | 3 |
| Quinone dioxime | 2 |
| Pb$_3$O$_4$ | 10 |
| HAF black | 50 |

The curing was effected by pressing at 160° C. for 30 minutes and then aging at 150° C. for 15 hours. The vulcanizate was tested by means of a Shopper's tester to obtain the results of a tensile strength of 184 kg./cm.$^2$, an elongation of 310%, and a 300% modulus of 180 kg./cm.$^2$.

On the other hand, polymerization was effected under the same conditions as above, using 5 mmol of dicyclopentadiene in place of the 5-chloro-norbornene-2, whereby 9.62 g. of copolymer was obtained in 15 minutes. From this, it is understood that dicyclopentadiene is lower in polymerization activity than chloro-norbornene.

EXAMPLE 5

A 2 l. four-necked flask was evacuated, replaced with nitrogen, charged with 1 l. of n-heptane and cooled to −20° C. Into the flask, an ethylene-propylene mixed gas containing 50 mol percent of ethylene was introduced to saturate into the n-heptane. To the flask, with stirring, and while introducing said mixed gas at a rate of 3 N l./min., 50 mmol of 5-bromo-norbornene-2, 10 mmol of diethylaluminum chloride and 0.25 mmol of vanadyl trichloride were added. By polymerization for 6 minutes, 11.05 g. of a white solid copolymer was obtained. The copolymer had an intrinsic viscosity of 6.03, a propylene content of 21.6 mol percent, and an iodine number of 2.7. The copolymer was subjected to carbon-compounding sulfur-curing to obtain a vulcanizate having a tensile strength at break of 239 kg./cm.$^2$, an elongation of 430% and a 300% modulus of 137 kg./cm.$^2$.

EXAMPLE 6

A 2 l. four-necked flask was evacuated, replaced with nitrogen, charged with 1 l. of n-heptane and saturated at 25° C. with an ethylene-propylene mixed gas containing 50 mol percent of ethylene. To the flask, 50 mmol of 5,5,6-trichloro-norbornene-2, 4 mmol of ethylaluminum sesquichloride (AlEt$_{1.5}$Cl$_{1.5}$) and 0.25 mmol of vanadyl trichloride were added, with stirring, and polymerization was effected for 15 minutes in the mixed gas current to obtain 22.30 g. of a copolymer having an intrinsic viscosity of 3.44 and an iodine number of 2.5. The copolymer was subjected to carbon-compounding sulfur-curing to obtain a vulcanizate showing a tensile strength of 61 kg./cm.$^2$ and an elongation of 370%.

Under the same conditions, 4-methyl-5-chloronorbornene-2; 5,7-dichloro - norbornene-2; 4,7,7-trimethyl-5-chloro-norbornene-2; 5-chloro - 6 - methyl-norbornene-2; 5,6-dichloro-norbornene-2; and 2-phenyl - 5 - chloro-norbornene-2 were used, respectively, in place of the 5,5,6-trichloro-norbornene-2, to obtain similar ternary copolymers with ethylene-propylene.

EXAMPLE 7

A 2 l. four-necked flask was evacuated, replaced with nitrogen, charged with 1 l. of n-heptane, and then saturated at −20° C. with 50 mol percent of an ethylene-propylene mixed gas. To the flask, 50 mmol of 5-chloro-norbornene-2, 4 mmol of diethylaluminum chloride and 0.25 mmol of vanadium triacetylacetonate were added in this order. Polymerization was effected, with stirring, for 16 minutes to obtain 14.31 g. of a white solid copolymer having an intrinsic viscosity of 2.55, an iodine number of 2.6 and a chlorine content of 1.79 wt. percent. The copolymer was subjected to carbon-compounding sulfur-curing to obtain a vulcanizate showing a tensile strength of 303 kg./cm.$^2$, an elongation of 460% and a 300% modulus of 172 kg./cm.$^2$.

EXAMPLE 8

The same polymerization as in Example 7 was effected at 25° C. for 15 minutes, using 4 mmol of trihexylaluminum in place of the diethylaluminum chloride and 0.25 mmol of vanadium tetrachloride in place of the vanadium triacetylacetonate, to obtain 5.25 g. of a heptane-soluble copolymer and 1.17 g. of a heptane-insoluble copolymer. The heptane-soluble copolymer had an intrinsic viscosity of 2.74, a propylene content of 35.2 mol percent, an iodine number of 4.5 and a chlorine content of 3.95 wt. percent.

EXAMPLE 9

The same polymerization as in Example 7 was effected at 25° C. for 15 minutes, using 0.25 mmol of ethyl orthovanadate VO(OEt)$_3$ in place of the vanadium triacetylacetonate, to obtain 20.02 g. of a copolymer. It was recognized that the copolymer had an intrinsic viscosity of 1.79, a propylene content of 22.5 mol percent, an iodine number of 6.1 and a chlorine content of 2.55 wt. percent.

EXAMPLE 10

The same polymerization as in Example 7 was effected at −20° C. for 6 minutes, using 10 mmol of ethylaluminum dichloride, 10 mmol of benzenesulfonyl chloride and 0.0025 mmol of vanadyl trichloride in place of the diethylaluminum chloride and vanadium triacetylacetonate of the catalyst system, to obtain 2.95 g. of a copolymer having an intrinsic viscosity of 7.50 and an iodine number of 13.8.

EXAMPLE 11

A 2 l. four-necked flask was evacuated, flushed with nitrogen, and charged with 1 l. of n-heptane, and 100 g. of butene-1 was liquefied and dissolved therein at −20° C. The n-heptane was saturated with ethylene. To the flask, 50 mmol of 5-chloro-norbornene-2, 10 mmol of diethylaluminum chloride and 0.25 mmol of vanadyl trichloride were added in this order, and polymerization was effected, with stirring, for 15 minutes to obtain 6.20 g. of a white solid copolymer having an intrinsic viscosity of 7.43 and an iodine number of 1.5.

EXAMPLE 12

A 2 l. four-necked flask was evacuated, flushed with nitrogen and charged with 1 l. of a mixed solvent of heptane fraction (which was substantially zero in iodine number and sulfur compound) containing about 40% of a paraffinic hydrocarbon, about 55% of a naphthenic hydrocarbon and 5% of an aromatic hydrocarbon. The flask was cooled to −20° C. and the solvent was saturated with an ethylene-propylene mixed gas containing 50 mol percent of ethylene. To the flask, 50 mmol of 5-chloro-norbornene-2, 10 mmol of diethylaluminum chloride and 0.25 mmol of vanadyl trichloride were added in this order, and polymerization was effected, with stirring, for 7 minutes to obtain 12.80 g. of a copolymer. This copolymer had an intrinsic viscosity of 4.70, a propylene content of 23.2 mol percent, an iodine number of 7.1 and a chlorine content of 2.23 wt. percent. The copolymer was subjected to carbon-compounding sulfur-curing to obtain a vulcanizate showing a tensile strength of 277 kg./cm.$^2$, an elongation of 490% and a 300% modulus of 134 kg./cm.$^2$.

EXAMPLE 13

The same polymerization as in Example 12 was effected for 5 minutes, using toluene in place of the heptane fraction mixed solvent to obtain 17.60 g. of a copolymer having an intrinsic viscosity of 2.55, a propylene content of 32.0 mol percent, and an iodine number of 2.2.

EXAMPLE 14

The same polymerization as in Example 12 was effected effected for 5 minutes, using tetrachloroethylene in place of the heptane fraction mixed solvent, to obtain 10.19 g. of a copolymer having an intrinsic viscosity of 3.95, a propylene content of 10.5 mol percent and an iodine number of 3.5.

EXAMPLE 15

A 2 l. four-necked flask was evacuated, flushed with nitrogen, charged with 1 l. of n-heptane and cooled to —20° C. Into the flask, a mixed gas containing 35 mol percent of ethylene, 35 mol percent of propylene and 30 mol percent of hydrogen was introduced at a rate of 3 N l/min. to saturate into the n-heptane. To the flask, 50 mmol of 5-chloro-norbornene-2, 10 mmol of diethylaluminum chloride and 0.25 mmol of vanadyl trichloride were added, and polymerization was effected, with stirring, for 10 minutes to obtain 13.98 g. of a copolymer having an intrinsic viscosity of 2.64, a propylene content of 21.6 mol percent and an iodine number of 5.0. The copolymer was subjected to carbon-compounding sulfur-curing to obtain a vulcanizate having a tensile strength of 277 kg./cm.$^2$, an elongation of 490% and a 300% modulus of 134 kg./cm.$^2$.

EXAMPLE 16

A 2 l. four-necked flask provided with a stirrer was evacuated, replaced with nitrogen and charged with 1 l. of n-heptane. Into the flask, an ethylene-propylene mixed gas containing 50 mol percent of ethylene was introduced at 25° C. for 40 minutes at a rate of 3 N l./min. to saturate into the n-heptane. To the flask, 50 mmol of 5-methyl-norbornene, 4 mmol of ethylaluminum sesquichloride (AlEt$_{1.5}$Cl$_{1.5}$) and 0.25 mmol of vanadyl trichloride were added in this order, and copolymerization was effected for 45 minutes while introducing said mixed gas. After 45 minutes, about 15 ml. of methanol was added to cease the polymerization. The reaction mixture, which was a homogeneous solution, was washed several times with a hydrochloric acid-methanol mixed liquid, was then washed with water and was finally charged into a large amount of methanol to deposit a polymer. The mixture was vacuum-dried at 50° C. to obtain 12.29 g. of a white solid copolymer. The copolymer was dissolved in xylene and was subjected to viscosity measurement to obtain an intrinsic viscosity value of 2.27 dl./g. The iodine number of the copolymer was 3.7.

On the other hand, the copolymer was subjected to carbon-compounding sulfur-curing according to the prescription shown in Example 1, whereby the vulcanizate showed a tensile strength at break of 210 kg./cm.$^2$ and an elongation of 280%. A copolymer obtained according to the same polymerization prescription without the addition of methylnorbornene was sulfur-cured and subjected, to tensile test, whereby the copolymer was cut at a tensile strength of 0 kg./cm.$^2$ and an elongation of 120%.

Under the same conditions as above, diethylaluminum chloride-triethyl orthovanadate, ethylaluminum dichloride-vanadyl trichloride-benzenesulfonyl chloride and trihexylaluminum-vanadium tetrachloride were used as catalysts to obtain similar ternary copolymers as well.

EXAMPLE 17

The same flask as in Example 16 was charged with n-heptane in a nitrogen current, cooled to —20° C., and saturated with an ethylene-propylene mixed gas containing 50 mol percent of ethylene. To the flask, 50 mmol of 5-methyl-norbornene, 10 mmol of diethylaluminum chloride and 2 mmol of vanadium triacetylacetonate were added in this order, and polymerization was effected for 15 minutes, while introducing said monomer mixed gas, to obtain 23.20 g. of a white solid copolymer having an intrinsic viscosity of 3.45 dl./g. and an iodine number of 0.9. From the infrared absorption spectrum of a film of the copolymer, the propylene content was measured as a value of 11.0 mol percent. The copolymer was subjected to carbon-compounding sulfur-curing according to the same prescription as in Example 1, to obtain a rubber of excellent quality having a tensile strength of 180 kg./cm.$^2$, an elongation of 620% and a 300% modulus of 80 kg./cm.$^2$.

Under the same conditions as above, 150 g. of butene-1 was charged in place of the propylene, and copolymerization was effected, while introducing ethylene, to obtain a ternary copolymer of ethylene-butene-1-methyl-norbornene partly containing heptane insolubles.

EXAMPLE 18

Copolymerization was effected under the same conditions as in Example 16, except that 50 mmol of 5-ethyl-norbornene was used in place of the methyl-norbornene, to obtain 6.49 g. of a heptane soluble copolymer having an intrinsic viscosity of 2.00 dl./g. The copolymer was subjected to sulfur-curing according to the same prescription as in Example 1 to obtain a vulcanizate showing a tensile strength of 144 kg./cm.$^2$ and an elongation of 190%.

EXAMPLE 19

A 2 l. four-necked flask was charged with 1 l. of n-heptane in a nitrogen current, cooled to —10° C. and saturated with an ethylene-propylene mixed gas containing 45 mol percent of ethylene. To the flask, 100 mmol of 5-ethyl-norbornene, 10 mmol of diethylaluminum chloride and 0.25 mmol of vanadyl trichloride were added in this order, and polymerization was effected for 45 minutes to obtain 14.60 g. of a white solid copolymer having an intrinsic viscosity of 3.03 dl./g. and an iodine number of 0.8. The copolymer was subjected to sulfur-curing under the same conditions as in Example 1 to obtain a vulcanizate having a tensile strength of 221 kg./cm.$^2$ and an elongation of 200%.

EXAMPLE 20

The same polymerization as in Example 16 was effected for 15 minutes, using 50 mmol of 5-phenyl-norbornene in place of the methyl-norbornene, to obtain 7.85 g. of a copolymer having an intrinsic viscosity of 1.24 dl./g. and an iodine number of 20.4. The copolymer was subjected to sulfur-curing under the same conditions as in Example 1 to obtain a rubber having a tensile strength of 111 kg./cm.$^2$ and an elongation of 110%.

Further, the copolymerization of Example 16 was repeated using 5,5-dimethyl-norbornene, 2,5,5-trimethylnorbornene, 1,5,5-trimethyl-norbornene, 5,7,7-trimethyl-norbornene, 5-benzyl-norbornene, 5-cyclohexyl-norbornene, and 5-(2'-ethyl-hexyl)-norbornene, in place of the methyl-norbornene, to obtain copolymers having the similar characteristics as above.

What we claim is:
1. Amorphous sulfur-curable terpolymers of (1) substituted norbornenes having the formula,

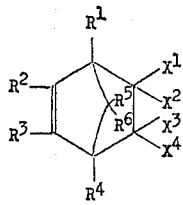

wherein $X^1$, $X^2$, $X^3$ and $X^4$ are each a halogen, hydrogen or a hydrocarbon group having from 1 to 20 carbon atoms and selected from the group consisting of alkyl, aryl, aralkyl, alkylaryl, and cycloalkyl and at least one of them is a halogen or hydrocarbon group, and $R^1$, $R^2$, $R^3$, $R^4$, $R^5$ and $R^6$ are each hydrogen, a hydrocarbon group having from 1 to 20 carbon atoms and selected from the group consisting of alkyl, aryl, aralkyl, alkylaryl, and cycloalkyl or halogen; (2) ethylene; and (3) α-olefins having the formula $$CH_2=CHR^7$$

wherein $R^7$ is a hydrocarbon group having 1 to 20 carbon atoms.

2. A terpolymer according to claim 1, wherein the substituted norbornene is 5-chloro-norbornene-2, 5-bromo-norbornene-2, 5,5,6-trichloro-norbornene-2, 5-methyl-norbornene-2, 5-ethyl-norbornene-2, or 5-phenyl-norbornene-2.

3. A terpolymer according to claim 1, wherein the α-olefin is propylene or butene-1.

4. A process for producing terpolymers of (1) substituted norbornenes, (2) ethylene and (3) α-olefins having at least three carbon atoms, characterized by contacting substituted norbornenes having the formula

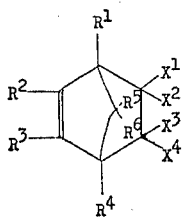

wherein $X^1$, $X^2$, $X^3$ and $X^4$ are each a halogen, hydrogen or a hydrocarbon group and at least one of them is a halogen or hydrocarbon group having from 1 to 20 carbon atoms and selected from the group consisting of alkyl, aryl, aralkyl, alkylaryl, and cylcloalkyl, and $R^1$, $R^2$, $R^3$, $R^4$, $R^5$ and $R^6$ are each hydrogen, a hydrocarbon group having from 1 to 20 carbon atoms and selected from the group consisting of alkyl, aryl, aralkyl, alkylaryl, and cycloalkyl or halogen; ethylene; and α-olefins having the general formula $$CH_2=CHR^7$$

wherein $R^7$ is a hydrocarbon group having 1 to 20 carbon atoms, with a catalyst system containing, as essential constituents, an organoaluminum compound having the formula $$AlR^8_n X^5_{3-n}$$

wherein $R^8$ is a hydrocarbon group having 1 to 20 carbon atoms, $X^5$ is a halogen and $n$ is an arbitrary number of 1 to 3, and a vanadium compound.

5. A process according to claim 4, wherein the organoaluminum compound is a diethylaluminum chloride, ethylaluminum sesquichloride or ethylaluminum dichloride.

6. A process according to claim 4, wherein the vanadium compound is a vanadium halide, vanadium oxyhalide, orthovanadate, halo-ortho-vanadate, vanadium acetylacetonate or vanadium halo-acetylacetonate.

7. An amorphous terpolymer according to claim 1, wherein the substituted norbornene monomer is selected from the group consisting of chloronorbornene, methylnorbornene and ethylnorbornene, and the α-olefin monomer is propylene.

8. A process according to claim 4, wherein the norbornene monomer is selected from the group consisting of 5-chloro-norbornene-2, 5-bromo-norbornene-2, 5,5,6-trichloro-norbornene-2, 5-methyl-norbornene-2, 5-ethyl-norbornene-2, or 5-phenyl-norbornene-2 and the α-olefin monomer is selected from the group consisting of propylene or butene-1.

9. A process according to claim 8, wherein the norbornene monomer is 5-chloro-norbornene-2, the α-olefin monomer is propylene and the catalyst is diethylaluminum chloride and vanadyl trichloride.

References Cited

UNITED STATES PATENTS

| | | | |
|---|---|---|---|
| 2,799,668 | 7/1957 | Anderson | 260—88.2 |
| 3,222,330 | 12/1965 | Nyce | 260—80.78 |
| 3,093,620 | 6/1963 | Gladding | 260—79.5 |
| 3,220,988 | 11/1965 | Hock | 260—82.1 |
| 3,291,780 | 12/1966 | Gladding | 260—80.5 |

JOSEPH L. SCHOFER, Primary Examiner

R. S. BENJAMIN, Assistant Examiner

U.S. Cl. X.R.

260—80.78